Figure 1:
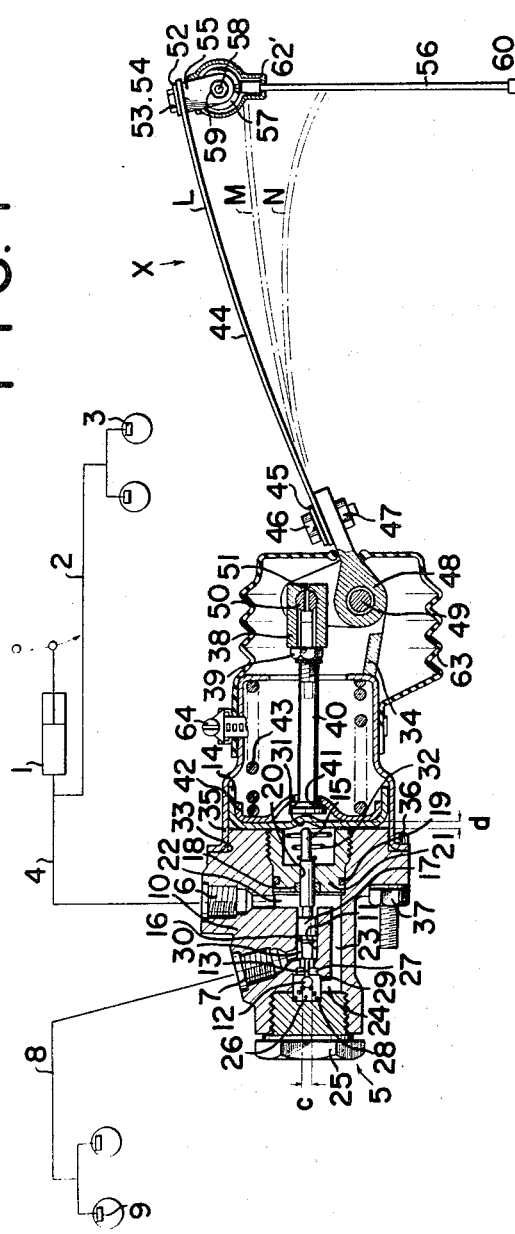

United States Patent
Masuda et al.

[11] 3,837,713
[45] Sept. 24, 1974

[54] LOAD SENSING PROPORTIONING VALVE

[75] Inventors: Moasuke Masuda, Higashi-Matsuyama; Toshihiro Abe, Kawagoe; Yoshihiko Kato, Higashi-Matsuyama, all of Japan

[73] Assignee: Jidosha Kiki Co., Ltd., Tokyo, Japan

[22] Filed: Mar. 19, 1973

[21] Appl. No.: 342,712

[30] Foreign Application Priority Data
Mar. 24, 1972 Japan.............................. 47-29027

[52] U.S. Cl.............. 303/22 R, 188/195, 188/349, 303/6 C
[51] Int. Cl.............................................. B60t 8/18
[58] Field of Search ........ 303/22, 23, 6 C; 188/195, 188/349

[56] References Cited
UNITED STATES PATENTS

| | | | |
|---|---|---|---|
| 3,233,947 | 2/1966 | Oberthür............................ | 303/6 C |
| 3,329,471 | 7/1967 | Oberthür............................ | 303/22 R |
| 3,684,329 | 8/1972 | Kawabe.............................. | 303/6 C |
| 3,690,420 | 9/1972 | Natschke.......................... | 303/22 R |

FOREIGN PATENTS OR APPLICATIONS
1,239,289 9/1968 Great Britain ................... 303/22 R

*Primary Examiner*—Trygve M. Blix
*Assistant Examiner*—D. C. Butler
*Attorney, Agent, or Firm*—Henry R. Lerner

[57] ABSTRACT

A load sensing proportioning valve for detecting the loading weight condition of a vehicle as represented by a distance between upper and lower positions of a spring. In this fashion, the fluid pressure acting on a rear wheel brake cylinder is controlled. The valve includes a push rod of a plunger; a loading spring coaxially mounted on the side of the push rod of the plunger, the load of the loading spring being applied to a housing during non-operation of a brake; a spacer spaced apart from the push rod arranged between the push rod and the loading spring; a leaf spring for reducing a load of the loading spring, the load being applied to one end of a lever and the leaf spring through connecting member; and a connecting wire wherein displacement at the other end of the leaf spring does not provide any displacement to the loading spring but transmits only a load or force.

5 Claims, 3 Drawing Figures

3,837,713

PATENTED SEP 24 1974

LOAD SENSING PROPORTIONING VALVE

Generally, in load sensing devices, springs are frequently used and are in an exposed condition especially on vehicles. Since a load sensing proportioning valve is usually positioned close to the rear axles, pebbles or other small objects hit the springs sometimes destroying the springs or other times interfering with the operation thereof by clogging the springs with mud snow or ice. This prevents the load sensing proportioning valve from accurately registering the force from the load sensing device so that the fluid pressure in a rear wheel brake cylinder may be inaccurately at a low level. During vehicle travel road surface vibration transmitted to the springs of the load sensing device and plunger of the load sensing proportioning valve reduce the durability of the plunger and sealing member.

An object of the present invention is to provide a small-sized load sensing proportioning valve which eliminates the above described disadvantage.

According to the present invention, a load sensing proportioning valve for detecting the loaded condition of a vehicle represented by a distance between upper and lower positions of a spring so as to control the fluid pressure acting on a rear wheel brake cylinder is provided. The valve comprises a push rod of a plunger; a loading spring coaxially mounted on the side of said push rod of the plunger, said loading spring being loaded by a housing during non-operation of a brake; a spacer spaced apart from said push rod arranged between said push rod and said loading spring; a leaf spring for reducing the load of said loading spring which is provided at an end of a lever through connecting means; and a connecting wire wherein displacement at the other end of said leaf spring does not provide any displacement to said loading spring but transmits only a load. The loading spring and the valve portion may be covered with a shell to exclude dust, mud, snow, and ice therefrom. During non-operation of the brake, there is a gap between the plunger controlling the valve by fluid pressure and said controlling load and a spacer transmitting said controlling load to said plunger so that spring vibration is not transmitted to the plunger and therefore wear of the plunger, sealing members and so on are not affected.

Figure 3:
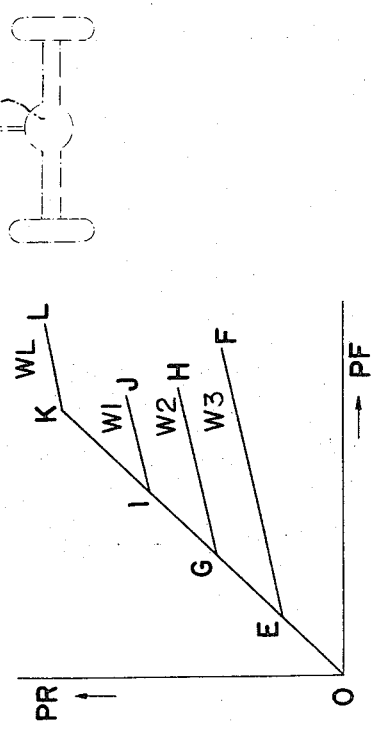
Figure 2:
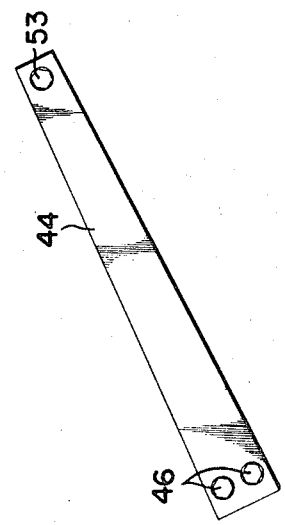

In order that this invention may be more readily understood, reference will now be made, by way of example, to the accompanying drawing, in which:

FIG. 1 shows an embodiment of pipings including a load sensing proportioning valve according to the present invention, FIG. 2 shows a form of a leaf spring as seen from a direction X of FIG. 1, and FIG. 3 shows the pressure characteristics of front and rear wheel brake cylinders.

An output port of a master cylinder 1 is connected by a pipe 2 to a front wheel brake cylinder 3 and also connected through a pipe 4 with a valve portion 5 in the load sensing proportioning valve as its input port 6. An output port 7 is connected through a pipe 8 to the rear wheel brake cylinder 9. In a cylindrical bore 11 there is slidably provided a plunger 17 having a rod 13 lifting a valve 12 and at the opposite end of the bore 11 there is a push rod 15 pushing a spacer 14 away from the housing 10 during operation, and also a seal member 16. At an end of the housing 10 a plug 21 is screw fitted and has seal members 18, 19 and in which said plunger 17 is slidably fitted into a cylinder 20. Between the plug 21 and housing 10 a chamber 22 is formed connected to the input port 6, the chamber 22 being connected to a chamber 26 formed between the housing 10 and the plug 25 screw fitted to the housing 10 through passages 23 and 24 provided in the housing 10. In chamber 26, there is provided a valve seat 27 for the valve 12 as above described. A spring 28 is provided to support the valve 12. The chamber 26 is connected to a chamber 30 by means of a passage 29, which chamber is connected to the output port 7.

There is provided a spring 32 between the spacer 14 and a stepped portion of the push rod 15, the spacer having a seat surface 31 opposite the push rod 15 of the plunger 17, as described above. A space $d$ is formed between the push rod 15 and the seat surface 31 of the spacer 14. A shell 35, in which the spacer 14 is slidably provided, is engaged on a boss 33 of the housing 10, integrated with a bracket 34 and secured to the housing 10 by means of a bolt 36 and a nut 37. Actuating rod 40 has a threaded portion at one end to be screw-fitted with a clevis 38, which is fastened by a lock nut 39, and has an engaging portion at the other end. A center portion of a spring retainer 42 forms a seat surface 41 of the engaging portion and the outer periphery of the spring retainer 42 slidably contacts the inner periphery of the spacer 14. Between the spring retainer 42 and shell 35 there is provided a loading spring 43. There is also provided a lever 48 with a leaf spring 44 attached thereto through a plate 45, a bolt 46, and a nut 47. The lever 48 is pivotally connected at a pin 49 on said bracket 34 and also pivotally mounted on the clevis 38 by means of a pin 50. A spring pin 51 is inserted into the clevis 38 and pin 50 to stop the pivotal movement of the clevis and pin.

At a distal end of the leaf spring 44, there is connected a bracket 55 by means of a plate 52, a bolt 53, and a nut 54. A terminal 57 of a connecting wire 56 is pivotally connected to the bracket 55 by a bolt 58 and a nut 59. A threaded portion 60 at the other end of the connecting wire 56 is secured to a rear wheel axle 61 through a bracket. A dust cover 62 is provided for preventing dust from reaching the pivotal portion of the terminal 57 of the connecting wire 56. For preventing dust from settling on the clevis 38 and lever 48 and preventing dust and water from entering the inside of the shell 35 a dust cover 63 is provided, which cover 63 is fixed to the outer periphery of the shell 35 by means of a fastener 64.

Operation of the device according to this invention will be described below.

[1] — During non-operation

The load sensing proportioning valve is fixed at a chassis of a vehicle by the bolt 36 and one end of the connecting wire 56 is secured to the rear wheel axle 61. As distance will increase between the chassis and rear wheel axle during the unladen condition of a vehicle, as seen from FIG. 1, the leaf spring 44 will have a large deflection as shown by dotted line N. In the case when lading weight is increased, the distance between the chassis and the rear wheel axle is lessened so that the amount of deflection of leaf spring 44 will decrease as shown by dotted line M and solid line L. In case the deflection of the leaf spring 44 is large, the load produced in the leaf spring 44 will increase. The load produced in the leaf spring 44 will be reflected in an amount proportional to the lever ratio. The increased load is transmitted to the actuating rod 40, which will actuate the spring retainer 42 in the direction opposite to the force of the loading spring 43. Therefore, the force pressing the spacer 14 which is in contact with the spring retainer 42 in the direction of the housing 10 will equal the load of the loading spring 43 minus the load which was produced in the leaf spring 44 and transmitted to the actuating rod 40.

It is now assumed that when the leaf spring 44 is in positions L, M and N, the loads transmitted to the actuating rod 40 are respectively WA1, WA2 and WA3. A fixed load of the loading spring 43 may be given by WL and loads of the spacer 14 pressing against the housing 10 are W1, W2, and W3, respectively, when the leaf spring 44 is in the positions, L, M and N, respectively, the following formulas are obtained.

$$W1 = WL - WA1 \quad (1)$$
$$W2 = WL - WA2 \quad (2)$$
$$W3 = WL - WA3 \quad (3)$$
$$WA1 < WA2 < WA3, W1 > W2 > W3 \quad (4)$$

Then, the plunger 17 is pushed by the spring 32 toward valve 12, and a space $d$ is formed between the push rod 15 of the plunger 17 and the seat surface 31 of the spacer 14. Therefore, the loads W1, W2 and W3 acting on the spacer 14 as shown in the formulas (1), (2) and (3) will not act on the plunger 17. Accordingly, road surface vibrations may be felt in the leaf spring 44, but that vibration may be absorbed by the leaf spring 44 and loading spring 43, without being transmitted to the plunger 17.

[2] — During operation

When a brake pedal is pushed, a pressure produced by the master cylinder 1 passes through the pipe 2 into the front wheel brake cylinder 3 causing a braking force. The pressure of the master cylinder passing through the pipe 4 enters into the chamber 22 from the input port 6 of the load sensing proportioning valve.

The cross sectional area of a large diameter part of the plunger 17 is given as A; the cross sectional area of a small diameter part of the plunger is designated B; a seat diameter of the valve seat 27 is C; output pressure of the master cylinder is PF; and pressure of the rear wheel brake cylinder is PR. The plunger 17 under pressure in the chamber 22 will act so as to push the valve 12 away from the valve seat 27 by force of $$PF (A - B) \quad (5)$$

The pressure in the chamber 22, on the other hand, will pass through the passages 23, 24 into the chamber 26 and then through the passage 29 into the chamber 30. Pressure in the chamber 30 urges the plunger 17 to push the spacer 14 away from the housing 10 by a force of $$PFA \quad (6)$$

The same pressure will pass from the outlet port 7 through the pipe 8 into the rear wheel brake cylinder 9 causing a braking force. Thus, the force acting on the plunger 17 by pressure in the chamber 22 and chamber 30 may be expressed by the formula.

$$PFA - PF (A - B) = PFB \quad (7)$$

The plunger 17 then receives a force pushing the spacer 14 away from the housing 10.

Now referring to FIG. 1, if it is assumed that a vehicle is in the unladen condition and the leaf spring 44 is in the position N, then the spacer 14 is acted on by a force or load W3 as in formula (3) in the direction opposite to that of the plunger 17 so that the plunger 17 will not be able to push the spacer 14 away from the housing 10 unless the following situation occurs.

$$PFB > W3 \quad (8)$$

When the pressure of the master cylinder rises so that PFB > W3, the plunger 17 will move to push the spacer 14 away from the housing 10, consequently the valve 12 may be seated in the valve seat 27. Thereafter, pressure of the master cylinder is raised so that the pressure in the chamber 22 will act in such direction that the plunger 17 may push the valve 12 away from the valve seat 27. When the valve 12 moves from the valve seat 27, the pressure of the master cylinder raised in the chamber 26 flows into the chamber 30. Therefore, the pressure in the chamber 30 will rise. The plunger 17 is pushed backwards. The valve 12 is seated in the valve seat 27 so that connection between the chambers 26 and 30 is cut off. Thus, when the pressure of the master cylinder is raised, the valve 12 alternately sits in or out of the valve seat 27. There is supplied a pressure reduced by a fixed relative to the rear wheel brake cylinder 9. The relation hereby established between the pressure PF of the front wheel brake cylinder and the pressure PR of the rear wheel brake cylinder may be expressed by the following formula.

$$PR = (A-B-C/A-C) PF + (W3/A - C) \quad (9)$$

When a vehicle is in the half laden condition and the leaf spring 44 moves to a position M, the load acting on the spacer 14 is W2 as expressed in the formula (2).
Therefore, $$PR = (A-B-C/A-C) PF + (W2/A-C) \quad (10)$$

From the relationship as shown in the above formula, the pressure of front and rear wheel brake cylinders will rise.

Also, when a vehicle is in the full loaded condition and the leaf spring 44 is in the position L, the load acting on the spacer 14 is W1 as seen in the formula (1).
Therefore, $$PR = (A-B-C/A-C) PF + (W1/A-C) \quad (11)$$

From the above relationship, the pressure of front and rear wheel brake cylinders will rise. The above formulas (9), (10) and (11) can be illustrated diagrammatically in FIG. 3, from which the pressure characteristics of the vehicle can be obtained.

During the unladen condition of a vehicle, the leaf spring 44 is positioned at N, the pressure characteristics being seen as in the formula (9) and shown by O-E-F in FIG. 3.

When the vehicle is in the half laden condition, the leaf spring 44 is positioned at M, the pressure characteristics of which may be expressed by the formula (10) as shown in FIG. 3 by O-G-H.

In case of the full loaded condition, the leaf spring 44 is positioned at L, the pressure characteristics of which then may be expressed by the formula (11) and as shown by O–I–J in FIG. 3.

Thus, displacement of the leaf spring 44 may change in accordance with the loading of a vehicle so that the load acting on the load sensing proportioning valve may change. When the connecting wire 56 is broken or the leaf spring 44 is cut off, the acting force of the leaf spring 44 relative to the actuating rod 40 may be zero. The load of the load sensing device acting on the plunger 17 is the load $WL$ of the loading spring 43. Hence, the pressure characteristics of the front and rear wheel brake cylinders may be expressed by the following formula.

$$PR = (A-B-C/A-C)\ PF + (WL/A-C) \qquad (12)$$

as shown by O–K–L in FIG. 3.

Since $WL$ is relatively large, even if the above break may occur, the rear wheel brake cylinder 9 can reach a high pressure in the same manner that the load sensing proportioning valve is not provided. In the same way, when the actuating rod 40, clevis 38, pins 49, 50 and lever 48 are broken a high pressure is reached in the rear wheel brake cylinder so that a braking force can be secured.

What is claimed is:

1. A load sensing proportioning valve system for detecting loading weight of a vehicle as applied to a leaf spring member by an axle of the rear wheel of the vehicle, said leaf spring member being movable between upper and lower portions in accordance with said loading weight, said system controlling the amount of fluid pressure applied to a rear wheel brake cylinder during brake pedal operation and comprising, a valve housing, a plunger located within said housing, a push rod integrally connected and coaxially aligned with said plunger, said plunger having a left limit position during non-operation of said brake pedal and being slidable toward said push rod end when said brake is operated, a loading spring coaxial with said plunger and said push rod bearing against said valve housing during non-operation of said brake, a spring retainer for retaining said loading spring in position and a spacer bearing against said spring retainer, the force of said loading spring bearing on the valve housing during non-operation of said brake through said spring retainer and spacer, said spacer having a seat coaxially aligned with said plunger and push rod and having a space formed between the closer end of said push rod and said seat, one end of said leaf spring connected to said axle of the rear wheel and the other end connected to a lever, an actuating rod connected to said lever and bearing against the rear portion of the seat of said spacer, the position of said leaf spring member responsive to the load of the vehicle being carried to said loading spring through said actuating rod and said spacer member to reduce the force of said loading spring and control the amount of pressure applied during braking in accordance with the loading condition of the vehicle.

2. A system in accordance with claim 1, further comprising a shell member attached to said valve housing covering said actuating rod, said loading spring, said spacer, and said spring retainer from foreign matter.

3. A system in accordance with claim 2, comprising a bracket member connected with said shell member, and a pin member rotatably connecting said lever with said bracket.

4. A system in accordance with claim 1, comprising a clevis connected to said lever and connected to one end of said actuating rod, said actuating rod being adjustably screw fitted within said clevis for adjusting the initial position of said system.

5. A system in accordance with claim 4, comprising a pin member rotatably connecting said clevis and said lever.

* * * * *